(12) United States Patent
Takahashi

(10) Patent No.: US 12,641,315 B2
(45) Date of Patent: May 26, 2026

(54) IMAGE PROCESSING SYSTEM, IMAGE PROCESSING METHOD, AND PROGRAM

(71) Applicant: NEC Corporation, Tokyo (JP)

(72) Inventor: Yusuke Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 19/092,973

(22) Filed: Mar. 27, 2025

(65) Prior Publication Data

US 2025/0227335 A1     Jul. 10, 2025

Related U.S. Application Data

(63) Continuation of application No. 17/563,261, filed on Dec. 28, 2021, now abandoned, which is a
(Continued)

(30) Foreign Application Priority Data

Jul. 31, 2012    (JP) ................................. 2012-170406

(51) Int. Cl.
*H04N 21/47* (2011.01)
*G06V 40/10* (2022.01)
(Continued)

(52) U.S. Cl.
CPC ........... *H04N 21/47* (2013.01); *G06V 40/103* (2022.01); *H04N 7/181* (2013.01);
(Continued)

(58) Field of Classification Search
None
See application file for complete search history.

(56) References Cited

U.S. PATENT DOCUMENTS 6,061,055 A     5/2000  Marks
6,271,805 B1    8/2001  Yonezawa
(Continued)

FOREIGN PATENT DOCUMENTS

CN          1574961        2/2005
CN         101321271      12/2008
(Continued)

OTHER PUBLICATIONS

Haering et al., "Automatic Visual Analysis for Transportation Security", 2007, IEEE, pp. 13-18. (Year: 2007).*
(Continued)

*Primary Examiner* — James M Anderson, II
(74) *Attorney, Agent, or Firm* — Sughrue Mion, PLLC

(57) ABSTRACT

The present invention provides an image processing system, an image processing method, and a program capable of suppressing confusion that may arise in a case where a target person is identified when tracking a person. An image processing system includes: a camera control unit which accepts input video images captured by a plurality of video cameras; a tracked person registering unit capable of registering one or more persons appearing in the video images inputted from the camera control unit; and a display screen generating unit which displays switchable windows of the video images inputted from the video cameras for each person registered by the tracked person registering unit.

23 Claims, 10 Drawing Sheets

Related U.S. Application Data continuation of application No. 16/925,183, filed on Jul. 9, 2020, now Pat. No. 11,343,575, which is a continuation of application No. 16/378,081, filed on Apr. 8, 2019, now Pat. No. 10,750,113, which is a continuation of application No. 14/416,716, filed as application No. PCT/JP2013/066565 on Jun. 17, 2013, now Pat. No. 10,841,528.

(51) Int. Cl.
　　*H04N 7/18*　　　　(2006.01)
　　*H04N 21/431*　　　(2011.01)

(52) U.S. Cl.
　　CPC ................... *H04N 21/4316* (2013.01); *G06T 2207/10016* (2013.01); *G06T 2207/30196* (2013.01)

(56) References Cited

U.S. PATENT DOCUMENTS

| | | | |
|---|---|---|---|
| 7,015,954 | B1 | 3/2006 | Foote et al. |
| 7,058,204 | B2 | 6/2006 | Hildreth et al. |
| 7,127,083 | B2 | 10/2006 | Han et al. |
| 7,196,722 | B2 | 3/2007 | White et al. |
| 7,286,157 | B2 | 10/2007 | Buehler |
| 7,304,662 | B1 | 12/2007 | Sullivan et al. |
| 7,613,324 | B2 | 11/2009 | Venetianer et al. |
| 7,643,653 | B2 | 1/2010 | Garoutte |
| 7,746,380 | B2 | 6/2010 | Maruya et al. |
| 7,777,783 | B1 | 8/2010 | Chin et al. |
| 7,843,491 | B2 | 11/2010 | Vallone et al. |
| 7,881,505 | B2 | 2/2011 | Schneiderman et al. |
| 8,174,572 | B2 | 5/2012 | Buehler et al. |
| 8,179,441 | B2 | 5/2012 | Yen et al. |
| 8,274,564 | B2 | 9/2012 | Girgensohn et al. |
| 8,390,684 | B2 | 3/2013 | Piran et al. |
| 8,437,508 | B2 | 5/2013 | Akisada et al. |
| 8,655,020 | B2 * | 2/2014 | Saptharishi ............ H04N 23/63 382/103 |
| 10,424,342 | B2 | 9/2019 | Brown et al. |
| 2003/0025599 | A1 | 2/2003 | Monroe |
| 2005/0122397 | A1 | 6/2005 | Henson et al. |
| 2005/0152579 | A1 | 7/2005 | Park et al. |
| 2005/0265582 | A1 | 12/2005 | Buehler et al. |
| 2006/0221184 | A1 | 10/2006 | Vallone et al. |
| 2006/0225114 | A1 | 10/2006 | Walker et al. |
| 2007/0182818 | A1 | 8/2007 | Buehler |
| 2007/0206834 | A1 | 9/2007 | Shinkai et al. |
| 2008/0018738 | A1 | 1/2008 | Lipton et al. |
| 2008/0144890 | A1 | 6/2008 | Ogawa |
| 2008/0292140 | A1 | 11/2008 | Morris et al. |
| 2008/0303901 | A1 | 12/2008 | Variyath et al. |
| 2008/0304706 | A1 | 12/2008 | Akisada et al. |
| 2009/0079831 | A1 | 3/2009 | Sethuraman et al. |
| 2009/0153654 | A1 | 6/2009 | Enge et al. |
| 2009/0183177 | A1 | 7/2009 | Brown et al. |
| 2009/0225163 | A1 | 9/2009 | Chathukutty et al. |
| 2009/0251537 | A1 | 10/2009 | Keidar et al. |
| 2009/0288011 | A1 * | 11/2009 | Piran ........................ G06F 3/048 715/720 |
| 2009/0295918 | A1 | 12/2009 | Horovitz et al. |
| 2010/0002082 | A1 | 1/2010 | Buehler et al. |
| 2010/0157050 | A1 | 6/2010 | Drive et al. |
| 2010/0183227 | A1 | 7/2010 | Park |
| 2010/0201815 | A1 | 8/2010 | Anderson et al. |
| 2011/0007139 | A1 * | 1/2011 | Brunetti ........... G08B 13/19669 348/51 |
| 2011/0019003 | A1 | 1/2011 | Asa et al. |
| 2011/0169867 | A1 * | 7/2011 | Kniffen ............... G06F 3/04855 345/660 |
| 2011/0170749 | A1 | 7/2011 | Schneiderman et al. |
| 2011/0228092 | A1 | 9/2011 | Park et al. |
| 2011/0317010 | A1 | 12/2011 | Dhanapal et al. |
| 2012/0007975 | A1 | 1/2012 | Lyons et al. |
| 2012/0019644 | A1 | 1/2012 | Hamabashiri et al. |
| 2012/0026308 | A1 | 2/2012 | Johnson et al. |
| 2012/0062732 | A1 | 3/2012 | Marman et al. |
| 2012/0113264 | A1 | 5/2012 | Moshrefi et al. |
| 2012/0120241 | A1 | 5/2012 | Lewis et al. |
| 2012/0188370 | A1 | 7/2012 | Bordonaro |
| 2012/0194336 | A1 * | 8/2012 | Thiruvengada ........ H04N 7/183 340/525 |
| 2013/0050502 | A1 | 2/2013 | Saito et al. |
| 2013/0091432 | A1 | 4/2013 | Shet et al. |
| 2013/0208124 | A1 | 8/2013 | Boghossian et al. |
| 2013/0329958 | A1 | 12/2013 | Oami et al. |
| 2015/0103178 | A1 | 4/2015 | Itoh et al. |

FOREIGN PATENT DOCUMENTS

| | | |
|---|---|---|
| CN | 102170560 | 8/2011 |
| EP | 1 150 510 A2 | 10/2001 |
| EP | 1489847 A3 | 5/2011 |
| EP | 2458553 A1 | 5/2012 |
| EP | 2596630 A1 | 5/2013 |
| GB | 2482127 A | 1/2012 |
| JP | 8-221592 | 8/1996 |
| JP | 2001-236514 | 8/2001 |
| JP | 2006-093955 A | 4/2006 |
| JP | 2008-219570 | 9/2008 |
| JP | 2010-49349 | 3/2010 |
| WO | 2009/038994 A1 | 3/2009 |
| WO | 2009/079809 A1 | 7/2009 |
| WO | 2012/131816 A1 | 10/2012 |

OTHER PUBLICATIONS

International Search Report mailed Jul. 30, 2013 in corresponding PCT International Application.

Written Opinion and Search Report issued by the Singapore Patent Office on Aug. 5, 2016, in counterpart Singapore Patent Application No. 11201500693Q.

Notification of the First Office Action issued on Jun. 20, 2017, from the State Intellectual Property office of the People's Republic of China is counterpart Chinese Paten Application No. 201380040754.3.

Office Action, dated Mar. 18, 2020, issued by the United States Patent Office in counterpart U.S. Appl. No. 14/416,716.

U.S. Office Action dated Jan. 23, 2020, issued in co-pending U.S. Appl. No. 16/286,430.

Non-final U.S. Office Action dated Oct. 21,2019, issued on co-pending U.S. Appl. No. 16/286,449.

U.S. Appl. No. 17/563,261, filed Dec. 28, 2021.

U.S. Appl. No. 16/925,183, filed Jul. 9, 2020.

U.S. Appl. No. 16/378,081, filed Apr. 8, 2019.

U.S. Appl. No. 14/416,716, filed Jan. 23, 2015.

SangKyu Kang et al., "Multiple-camera tracking system with seamless object handover", Proc. SPIE, vol. 4303, pp. 27-34, 2001.

Fatih Porikli, "Intercamera color calibration by correlation model function", IEEE, 2003.

Omar Javed et al., "Appearance modeling for tracking in multiple non-overlapping cameras", IEEE, 2005.

Kuan-Wen Chen et al., "An adaptive learning method for target tracking across multiple cameras", IEEE, 2008.

Bryan Prosser et al., "Person re-identification by support vector ranking", BMVC 2010, doi:10.5244/c.24.21.

Jae-Ho Lee, "Automatic Video Management System Using Face Recognition and MPEG-7 Visual Descriptors", ETRI Journal, vol. 27, No. 6, Dec. 2005, pp. 806-809.

GeoVision, GV Series (CMS/Video Analytics), Sep. 30, 2011.

Avigilon, Avigilon Control Center with High Definition Stream Management (HDSM).

Axis Introduces HDTV Image Quality and Precise Iris Control in New Fixed Day and Night Network Camera Series; AXIS P13 Network Cameras Ideal for Securing Government Buildings, Retail

(56) References Cited

OTHER PUBLICATIONS

Environments, Airports, Public Transportation, Business Wire, May
11, 2009.

* cited by examiner

IMAGE PROCESSING SYSTEM, IMAGE PROCESSING METHOD, AND PROGRAM

CROSS-REFERENCE TO RELATED APPLICATIONS

The present application is a continuation application of U.S. patent application Ser. No. 17/563,261 filed on Dec. 28, 2021, which is a continuation of U.S. patent application Ser. No. 16/925,183 filed on Jul. 9, 2020, which issued as U.S. Pat. No. 11,343,575, which is a continuation application of U.S. patent application Ser. No. 16/378,081 filed on Apr. 8, 2019, which issued as U.S. Pat. No. 10,750,113, which is a continuation application of U.S. patent application Ser. No. 14/416,716 filed on Jan. 23, 2015, which issued as U.S. Pat. No. 10,841,528, which is a National Stage Entry of international application PCT/JP2013/066565, filed on Jun. 17, 2013, which claims the benefit of priority from Japanese Patent Application 2012-170406 filed on Jul. 31, 2012, the disclosures of all of which are incorporated in their entirety by reference herein.

BACKGROUND

Aspects of the present invention relate to an image processing system, an image processing method, and a program.

In recent years, systems for carrying out monitoring over a wide range using video images from a plurality of cameras are being considered. For example, Patent Publication JP-A-2008-219570 discloses a device that is capable of appropriately tracking (monitoring) a person across cameras using inter-camera coupling relation information. The device determines a correspondence relation of a person in accordance with a similarity in person feature quantities between a point where a person appears in a camera view (an appearing point) and a point where the person disappears from the camera view (a vanishing point).

When person re-identification is automatically determined according to similarity as is the case of the device described in Patent Publication JP-A-2008-219570, errors occur with a probability. In consideration thereof, person re-identification is implemented with human involvement.

However, increasing human involvement with respect to monitoring is highly likely to complicate monitoring work. In particular, when there is a plurality of persons who are subjects under monitoring, it may become difficult for a user to comprehend for which person operations are being performed, or operations for specifying a person may become complicated.

SUMMARY

Some of the aspects of the present invention have been made in consideration of such problems, and an object of these aspects is to provide an image processing system, an image processing method, and a program capable of suppressing confusion that may arise with respect to identifying a target person when tracking a person.

An image processing system according to the present invention includes: input means for accepting input video images captured by a plurality of video cameras; registering means capable of registering one or more persons appearing in the video images inputted from the input means; and display control means for displaying switchable windows of the video images inputted from the video cameras for each person registered by the registering means.

Another image processing system according to the present invention includes: input means for accepting input video images captured by video cameras; and display control means for displaying for each registered person a switchable window of the video image inputted from the video camera, this display control means displaying information related to the video camera that has captured the person and a time of the image capture.

Still another image processing system according to the present invention includes: input means for accepting input video images captured by video cameras; and display control means for displaying for each registered person a switchable window of the video image inputted from the video camera, this display control means displaying map information showing trace of movement of each registered person.

An image processing method according to the present invention comprises the steps of: accepting input video images captured by a plurality of video cameras; registering one or more persons appearing in the inputted video images; and displaying switchable windows of the video images inputted from the video cameras for each registered person.

A program according to the present invention causes a computer to execute the processes of: accepting input video images captured by a plurality of video cameras; registering one or more persons appearing in the inputted video images; and displaying switchable windows of the video images inputted from the video cameras for each registered person.

Moreover, as used in the present invention, the terms "unit", "means", "device", and "system" not only signify physical means but also include cases where functions of the "unit", "means", "device", and "system" are realized by software. In addition, functions of one "unit", "means", "device", or "system" may be realized by two or more physical means or devices, and functions of two or more "units", "means", "devices", or "systems" may be realized by one physical means or device.

According to the present invention, an image processing system, an image processing method, and a program capable of suppressing confusion that may arise with respect to identifying a target person when tracking a person can be provided.

EXEMPLARY EMBODIMENT

Figure 1:
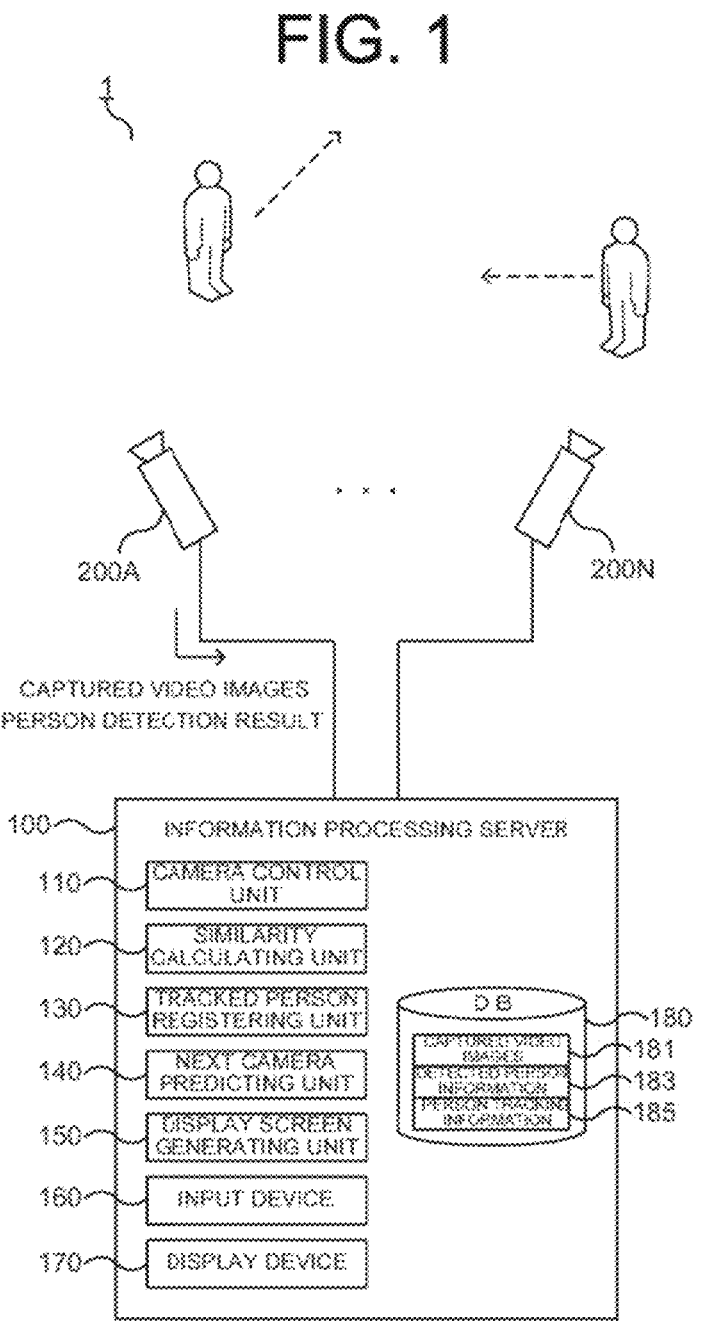
FIG. 1 is a functional block diagram showing a schematic configuration of a monitoring system according to a first embodiment.

Hereinafter, embodiments of the present invention will be described. In the following description and in the description of the referenced drawings, same or like components are represented by same or like reference characters.

1 First Embodiment

FIGS. 1 to 5 are diagrams for describing a first embodiment. Hereinafter, the first embodiment will be described in the order explained below with reference to these drawings. First, a functional configuration of a system as a whole is presented in "1.1", and an outline of the first embodiment as a whole is presented in "1.2" by showing a specific example of a display screen. Subsequently, a flow of processes is presented in "1.3", and a specific example of a feasible hardware configuration is presented in "1.4". Finally, operational effects achieved by the present embodiment and the like are described in "1.5" and thereafter.

1.1 Functional Configuration

A functional configuration of a monitoring system 1 that is an information processing system according to the present embodiment will now be described with reference to FIG. 1. FIG. 1 is a block diagram showing a functional configuration of the monitoring system 1.

The monitoring system 1 is roughly constituted by an information processing server 100 and a plurality of video cameras 200 (video cameras 200A to 200N will be collectively referred to as a video camera 200) for capturing video images.

The video camera 200 captures (photographs) a video image. In addition, the video camera 200 judges whether or not a person appears in the captured video image, and transmits information related to the person such as a position and a visual feature of the person in the video image to the information processing server 100 together with the captured video image. Furthermore, the video camera 200 can perform tracking of a person in captured video images.

Moreover, processes such as detection of a person, extraction of a visual feature of a person, and tracking of a person inside a camera can be performed by, for example, the information processing server 100 or another information processing device (not shown).

The information processing server 100 performs various processes such as detection of a person, registration of a person to be tracked, and tracking of a registered person by analyzing a video image captured by the video camera 200.

While a case where a person monitoring is performed based on a real-time video image captured by the video camera 200 will be described below, the present embodiment is not limited to this case and, for example, monitoring (analysis) can be performed on video images previously captured by the video camera 200.

The information processing server 100 comprises a camera control unit 110, a similarity calculating unit 120, a tracked person registering unit 130, a next camera predicting unit 140, a display screen generating unit 150, an input device 160, a display device 170, and a database (DB) 180.

Functions of the information processing server 100 may be realized by, for example, a plurality of devices such as a server and a client, in which case processes such as control of a camera (the camera control unit 110), registration of a person to be tracked (a person under monitoring) (the tracked person registering unit 130), prediction of a video camera 200 on which a tracking target person is to appear next (the next camera predicting unit 140), and generation of a display screen (the display screen generating unit 150) are performed by the server and processes such as input by a user (observer) (the input device 160) and output of a display screen (the display device 170) are performed by the client. Various methods of sharing processes between the server and the client are conceivable.

The camera control unit 110 controls the video camera 200. More specifically, based on an user instruction or the like inputted from the input device 160, the camera control unit 110 transmits commands for zooming in and zooming out, changing a camera direction upward, downward, leftward, or rightward, changing camera resolution, changing color correction parameters for white balance and gain control, and the like to the video camera 200. In addition, the camera control unit 110 registers a video image or person detection information received from the video camera 200 with the DB 180 as a captured video image 181 or detected person information 183.

The similarity calculating unit 120 implements processing of detecting a person under monitoring by calculating a similarity between a person appearing in a video image inputted from the video camera 200 and the person registered with person tracking information 185. In this process, accuracy of similarity calculation can be increased in the following way. The similarity calculating unit 120 calculates the similarity with selecting images of persons having a similar posture to that of a person in the video image inputted from the video camera 200 from a plurality of person images (person images of a same person taken at a plurality of timings) related to each registered person.

"similar posture" refers to a posture that have close value of parameters which describes human postures and states such as facing the front, backward, rightward, or leftward, bending down and whether or not the person is overlapping with another person.

Based on the user instruction and the like inputted from the input device 160, the tracked person registering unit 130 registers a person appearing in a captured video image inputted from the video camera 200 as a person under monitoring who is a tracking subject (a monitoring target/a tracking target) with the person tracking information 185 of the DB 180. In addition, when the person appearing in the captured video image inputted from the video camera 200 is judged to be the same person as a person already registered with the person tracking information 185, the tracked person registering unit 130 can also register the person in the person tracking information 185.

The next camera predicting unit 140 predicts a camera of in where a person appearing (or had disappeared) in one video camera 200 is likely to appear next. Examples of various conceivable prediction methods include a prediction calculated based on an installation interval between respective video cameras 200, a structure of a building, a walking pace of a person, or the like, and a probabilistic prediction made by statistically processing information such as frequency of a person disappear in a video camera and appear at another camera among video cameras 200.

The display screen generating unit 150 generates a display screen such as those shown in FIGS. 2 and 3 (to be described later) to be displayed by the display device 170. The display screen generated by the display screen generating unit 150 has a window 21 for each person who is a tracking subject. The window 21 can be switched to another window 21 of another tracking subject by a tab 25. A video image of the video camera 200 in which a person who is a tracking subject appears or is predicted to appear in the near future is arranged in each window 21. In addition, the display screen generating unit 150 causes the display device 170 to display a graphical user interface (GUI) which can be used to choose whether or not to newly register a person appearing in the video image as a person who is a tracking subject, whether or not to associate the person appearing in the video image as the same person as a person who has already been registered, or the like.

The input device 160 is a device used by a user (observer) for inputting various types of information. For example, a pointing device such as a mouse, a touch pad, or a touch panel, a keyboard, and the like corresponds to the input device 160. The various afore-mentioned processes performed by the tracked person registering unit 130 such as the registration of a person who is a subject and re-identification as a registered person and other various processes such as window switchover by the tab 25 are carried out based on operations of the input device 160.

The display device 170 is a display in which an image is displayed on, for example, a liquid crystal or an organic electro luminescence (EL). The display screen created by the display screen generating unit 150 is displayed by the display device 170.

The DB 170 is built on various storage devices such as a hard disk drive (HDD; not shown). The DB 180 manages a captured video image 181, detected person information 183, and person tracking information 185.

The captured video image 181 is a video image input from the video camera 200. Moreover, a portion of the captured video image 181 may be deleted, for example, a one of after a certain period of time of capturing or a one of which are judged as no person is appearing The detected person information 183 is information such as a visual feature of a person detected by the video camera 200, a date and time of capturing in the captured video image 181, or a person image.

The person tracking information 185 is information on a person judged to be a tracking subject by the tracked person registering unit 130 among persons detected as the detected person information 183. When persons appearing in video images taken by the plurality of video cameras 200 are associated with each other as the same person by the tracked person registering unit 130, such information is also registered in the person tracking information 185.

1.2 Specific Example of Display Screen

Hereinafter, a specific example of a display screen displayed by the display device 170 will be described with reference to FIGS. 2 and 3. FIGS. 2 and 3 are diagrams showing specific examples of a display screen (hereinafter, also referred to as a monitoring screen 20) that is displayed by the display device 170 for a person under monitoring. First, FIG. 2 will be described.

In the example shown in FIG. 2, the monitoring screen 20 comprises a window 21 including video image display regions 23A to 23D (hereinafter, also collectively referred to as a video image display region 23) which display captured video images input from the plurality of video cameras 200, and tabs 25A to 25C (hereinafter, also collectively referred to as a tab 25) for switching between the windows 21.

As described above, the video image display region 23 that is arranged in the window 21 displays multi-camera video images input from the plurality of video cameras 200. The video images of the video cameras 200 displayed in the respective video image display regions 23 may be switched at any time to other video images. For example, after a person who is a monitoring subject moves out of a display region, the display is conceivably switched to a video image of the video camera 200 in which the person is predicted to appear next or has appeared in accordance with the movement of the person.

The tabs 25 are for switching between the windows 21. A window 21 that can be switched to another window 21 by a tab 25 is provided for each person who is a monitoring subject. In the example shown in FIG. 2, the window 21 (including a corresponding video image display region 23) is set for each of three persons under monitoring who have been registered by the tracked person registering unit 130, and the window 21 can be switched to another window 21 by the tab 25.

Person images (thumbnails) 25A1 to 25C1 corresponding to the persons under monitoring are arranged on the tabs 25. Accordingly, the user who is a observer can recognize to which person under monitoring the window 21 that is switchable by each tab 25 corresponds to. In the example shown in FIG. 2, a person P1 corresponding to the person image 25A1 is shown in the video image display region 23D.

If a person under monitoring other than the person under monitoring presented to the user in the window 21 (in the example shown in FIG. 2, the person under monitoring corresponding to the person image 25A1) is detected to have appeared or predicted to appear in the near future by the next camera predicting unit 140 in a video image (video image) from any of the video cameras 200, the user is prompted to switch the window 21 to another window 21. In the example shown in FIG. 2, the user is prompted to switch to the tab 25B by a change in the color of the tab 25B or by blinking or flashing of the tab 25B.

Figure 3:
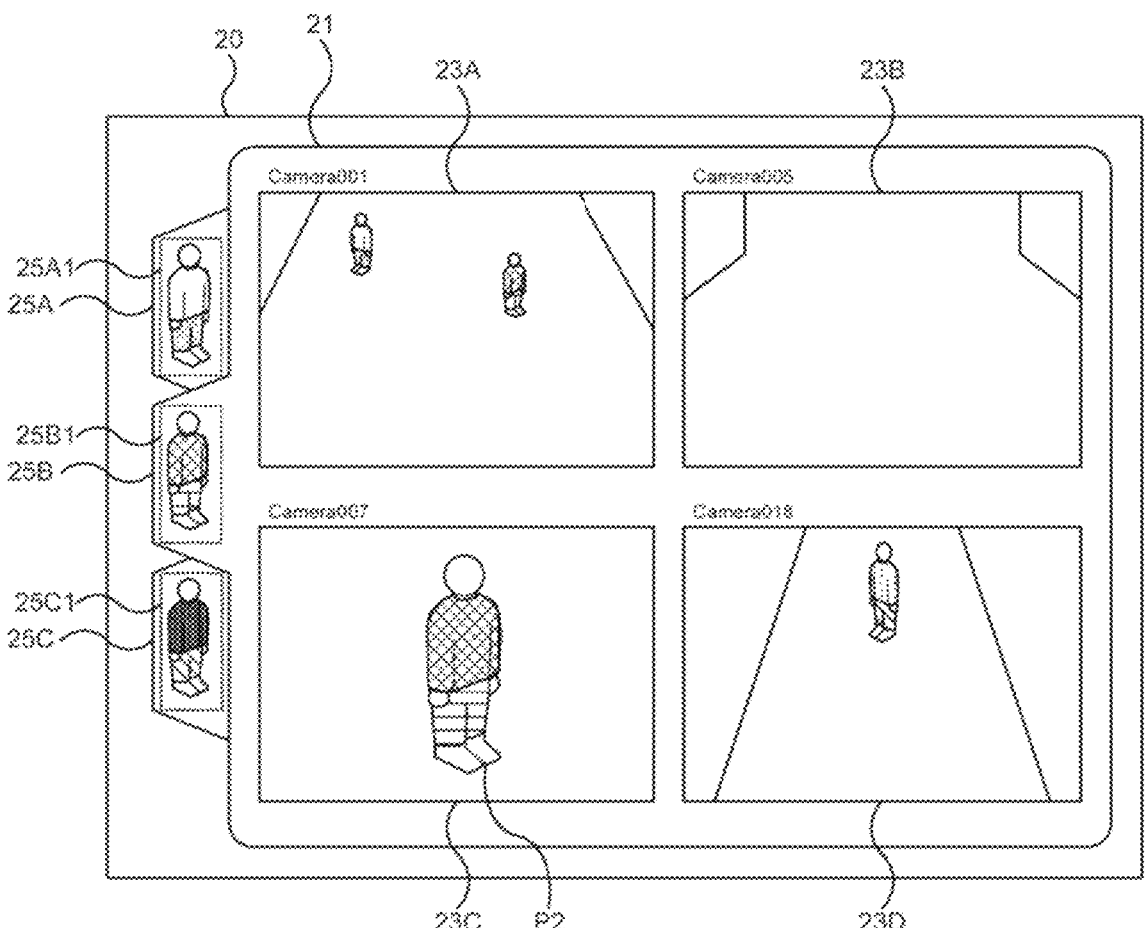
FIG. 3 is a diagram showing a specific example of the display screen.

FIG. 3 shows a specific example of a case where the window 21 is switched to another window 21 using the tab 25B. As shown in FIG. 3, a person P2 who is a person under monitoring (in the example shown in FIG. 3, a person under monitoring corresponding to the person image 25B1) appears in the video image display region 23C.

Moreover, while the display screen generating unit 150 notifies a state change of persons under monitoring (detection of a new person under monitoring or a prediction that a person under monitoring is to be detected in the near future) to the user who is a observer by a change in the color of the tab 25 or by blinking of the tab 25, notification is not limited thereto. For example, a notification may be made by displaying a window message or by sound.

Alternatively, the window 21 may conceivably be forcibly switched to another window 21 without involving a user operation when a new person under monitoring is detected or when a prediction that a person under monitoring is to be detected is made.

1.3 Flow of Processes

Figure 4:
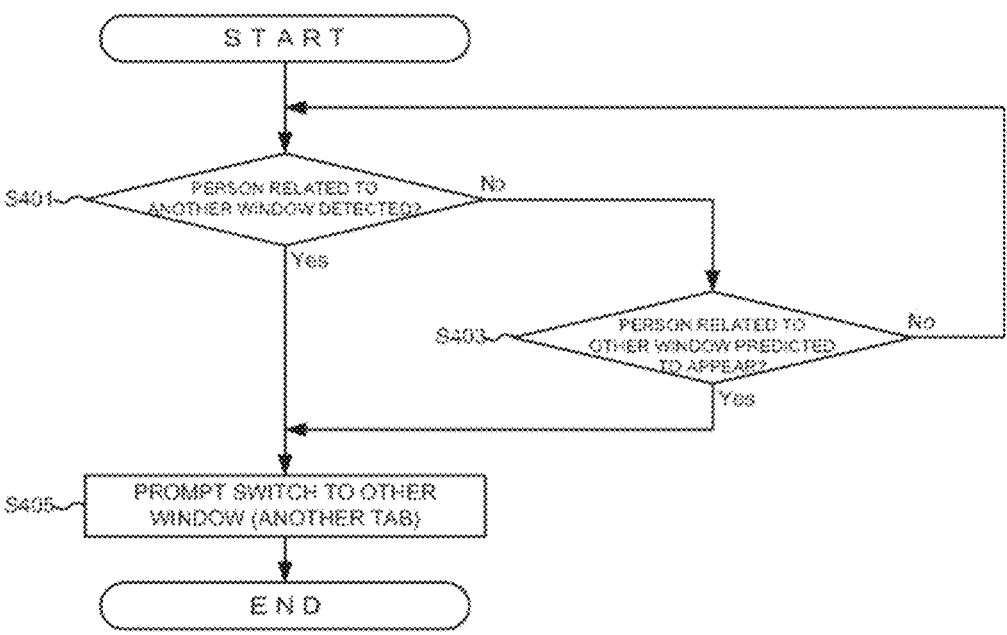
FIG. 4 is a flow chart showing a flow of processes of the information processing server shown in FIG. 1.

Next, processes performed by the information processing server 100 will be described with reference to FIG. 4. FIG. 4 is a flow chart showing a flow of processes of the information processing server 100 according to the present embodiment.

It should be noted that, as long as no contradictions are created in contents of the processes, the respective process steps described below can be arbitrarily reordered or executed in parallel, or another step may be added between the respective process steps. Furthermore, a step described as a single step for convenience' sake can be executed by dividing the step into a plurality of steps, and steps described divided into a plurality of steps for convenience' sake can be executed as a single step.

The similarity calculating unit 120 judges whether or not a different monitoring subject (person under monitoring) related to the window 21 displayed on the monitoring screen 20 has been detected (S401). For example, with the example shown in FIG. 2, the similarity calculating unit 120 judges whether or not a person under monitoring related to the person images 25B1 and 25C1 has been detected.

As a result, if a person under monitoring related to a window 21 that is not displayed is detected (Yes in S401), the display screen generating unit 150 prompts the user to switch the window 21 to another window 21 (switch the tab 25 to another tab 25) by changing the color of the tab 25 or by causing the tab 25 to blink.

In addition, even if a person under monitoring is not detected (No in S401), if the next camera predicting unit 140 predicts that the person under monitoring is to appear in another window 21 in the near future (for example, within five seconds) (Yes in S403), the display screen generating unit 150 proceeds to S405 to prompt the user to switch the window 21 to another window 21 by changing the color of the tab 25 or by causing the tab 25 to blink.

As described above, when a person who is a tracking subject (a person under monitoring) not mainly displayed appears or is predicted to appear in the near future in a video image of the video camera 200, the display screen generating unit 150 highlights the person who is a tracking subject by changing the color of the tab 25 or by causing the tab 25 to blink. Accordingly, even when there is a plurality of persons who are tracking subjects, since monitoring of the persons can be performed through a screen divided per person by the tabs 25, confusion can be avoided.

1.4 Specific Example of Hardware Configuration

Hereinafter, an example of a hardware configuration of the afore-mentioned information processing server 100 will be described with reference to FIG. 5. Moreover, as described earlier, the functions of the information processing server 100 can be realized by a plurality of information processing devices (for example, by a server and a client).

Figure 5:
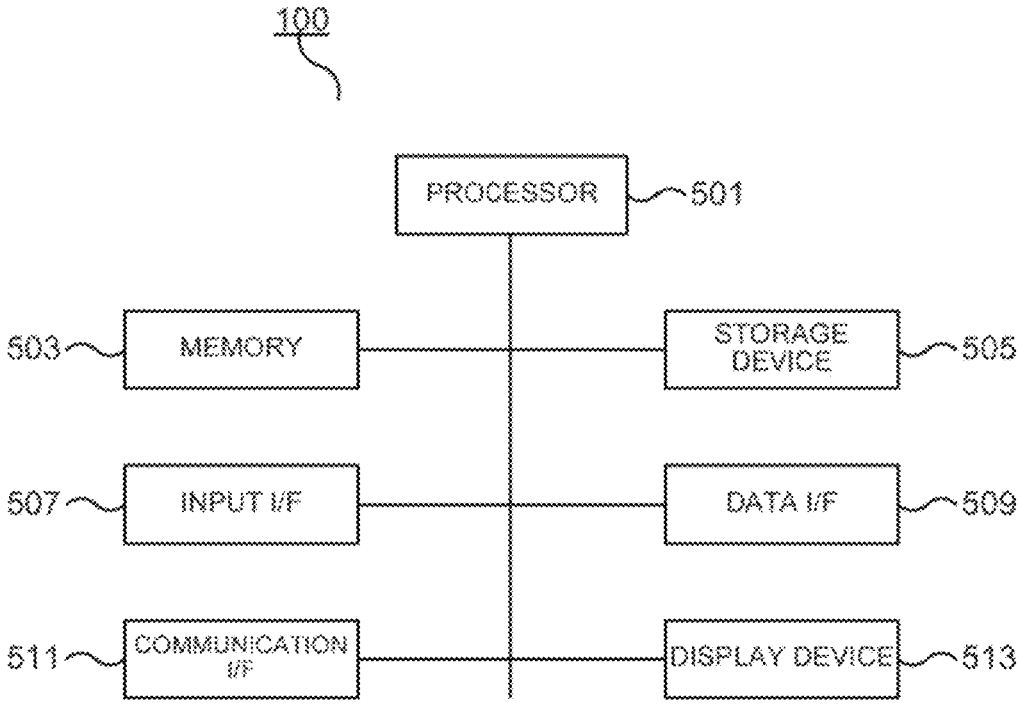
FIG. 5 is a block diagram showing a functional configuration of a hardware configuration capable of implementing the information processing server shown in FIG. 1.

As shown in FIG. 5, the information processing server 100 comprises a processor 501, a memory 503, a storage device 505, an input interface (I/F) 507, a data I/F 509, a communication I/F 511, and a display device 513.

The processor 501 controls various processes performed by the information processing server 100 by executing a program stored in the memory 503. For example, processes related to the camera control unit 110, the similarity calculating unit 120, the tracked person registering unit 130, the next camera predicting unit 140 and the display screen generating unit 150 described with reference to FIG. 1 can be realized as a program which is temporarily stored in the memory 503 and which mainly runs on the processor 501.

The memory 503 is a storage medium such as a random access memory (RAM). The memory 503 temporarily stores program codes of the program that is executed by the processor 501 and data necessary when executing the program. For example, a stack region that is required when executing the program is secured in a storage region of the memory 503.

The storage device 505 is a non-volatile storage medium such as a hard disk drive (HDD) or a flash memory. The storage device 505 stores an operating system, various programs for realizing the camera control unit 110, the similarity calculating unit 120, the tracked person registering unit 130, the next camera predicting unit 140, and the display screen generating unit 150, various data including captured video images 181, detected person information 183, and person tracking information 185 which are stored as the DB 180, and the like. Programs and data stored in the storage device 505 are referenced by the processor 501 by being loaded to the memory 503 as required.

The input I/F 507 is a device for accepting user input. The input device 160 described with reference to FIG. 1 is realized by the input I/F 507. Specific examples of the input I/F 507 include a keyboard, a mouse, a touch panel, and various sensors. The input I/F 507 may be connected to the information processing server 100 via an interface such as a universal serial bus (USB).

The data I/F 509 is a device for inputting data from outside the information processing server 100. Specific examples of the data I/F 509 include drive devices and the like for reading data stored in various storage media. The data I/F 509 may conceivably be provided outside the information processing server 100. In such a case, the data I/F 509 is connected to the information processing server 100 via an interface such as a USB.

The communication I/F 511 is a device for performing wired or wireless data communication with a device outside the information processing server 100 including the video camera 200. The communication I/F 511 may conceivably be provided outside the information processing server 100. In such a case, the communication I/F 511 is connected to the information processing server 100 via an interface such as a USB.

The display device 513 is a device for displaying various types of information including the monitoring screen 20 and is, for example, a liquid crystal display or an organic electro-luminescence (EL) display. The display device 513 may be provided outside the information processing server 100. In such a case, the display device 513 is connected to the information processing server 100 via a display cable or the like.

1.5 Operational Effects of the Present Embodiment

As described above, the information processing server 100 according to the present embodiment displays video images input from a plurality of video cameras 200 on windows 21 respectively generated for each monitoring subject. The windows 21 can be switched to another window 21 using the tabs 25. When a person who is a tracking subject (a person under monitoring) not mainly displayed appears or is predicted to appear in the near future in a video image of the video camera 200, the display screen generating unit 150 highlights the person who is a tracking subject by changing the color of the tab 25 or by causing the tab 25 to blink. Accordingly, even when there is a plurality of persons who are tracking subjects, since monitoring of the persons can be performed with a screen divided per person by the tabs 25, confusion can be avoided.

2 Second Embodiment

Figure 6:
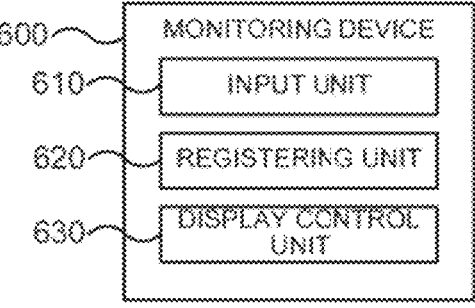
FIG. 6 is a functional block diagram showing a schematic configuration of a monitoring device according to a second embodiment.

Hereinafter, a second embodiment will be described with reference to FIG. 6. FIG. 6 is a block diagram showing a functional configuration of a monitoring device 600 that is an image processing system. As shown in FIG. 6, the monitoring device 600 comprises an input unit 610, a registering unit 620, and a display control unit 630.

The input unit 610 accepts input video images captured by a plurality of video cameras. The registering unit 620 is capable of registering one or more persons appearing in the video images inputted from the input unit 610.

The display control unit 630 displays switchable windows of video images inputted from the video cameras for each person registered by the registering unit 620.

By adopting such an implementation, the monitoring device 600 according to the present embodiment enables confusion that may arise with respect to identifying a target person when tracking a person to be suppressed.

3 Third Embodiment

Next, a monitoring system 1 according to a third embodiment will be described. In the following description, components identical to those in the first embodiment are referred to with the same reference numerals as those in the first embodiment, and explanation thereof are omitted. Explanation of operation and effect of these components are also omitted as necessary when they are identical to those in the first embodiment. This also applies to fourth and fifth embodiments.

Hereinafter, explanation is provided focusing on a difference between the monitoring system 1 according to the third embodiment and the monitoring system 1 according to the first embodiment.

The functional composition of the monitoring system 1 according to the present embodiment is basically similar to that according to the first embodiment shown in FIG. 1. A difference between these systems is related to a display screen generated by the display screen generating unit 150 and displayed on the display device 170. A specific example of the display screen generated by the display screen generating unit 150 according to the present embodiment is shown in FIG. 7.

Figure 7:
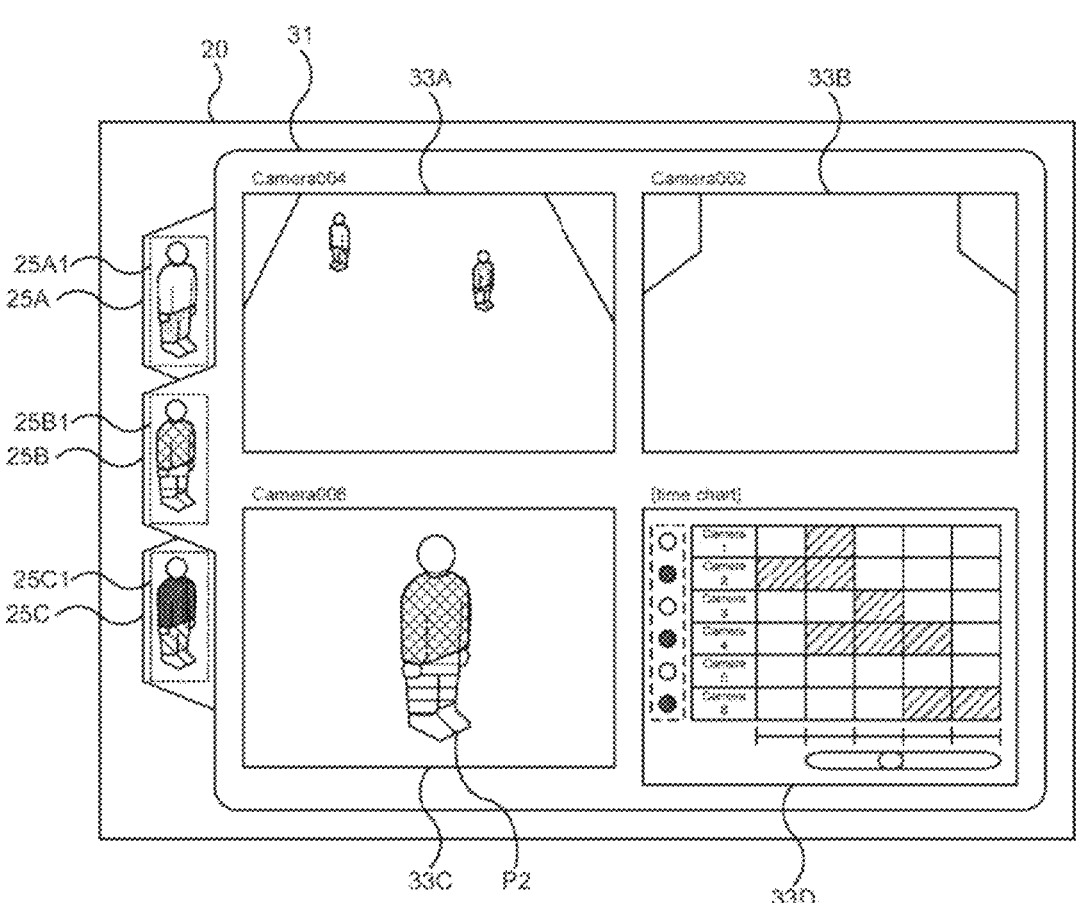
FIG. 7 is a diagram showing a specific example of a display screen according to a third embodiment.

In an example of a display screen shown in FIG. 7, a time chart image is arranged with video images which are captured by the video camera 200 and in which a tracking target person appears or in which a tracking target person is predicted to appear.

Figure 8:
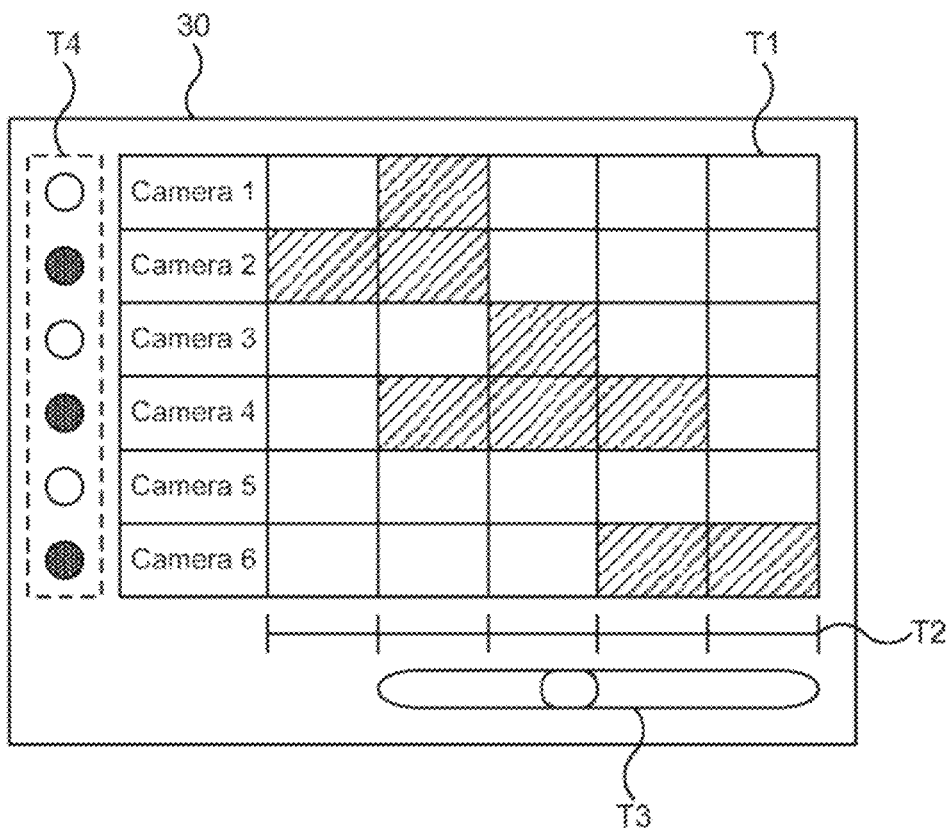
FIG. 8 is a diagram showing a specific example of a display screen according to a fourth embodiment.

With reference to FIG. 7 and FIG. 8, a specific example of a display screen displayed on the display device 170 according to the present embodiment is described. In the display screen shown as a specific example in FIG. 7, a time chart image is arranged to monitor a person under monitoring. (Hereinafter, the display screen is also referred to as a monitoring screen 30).

Figure 2:
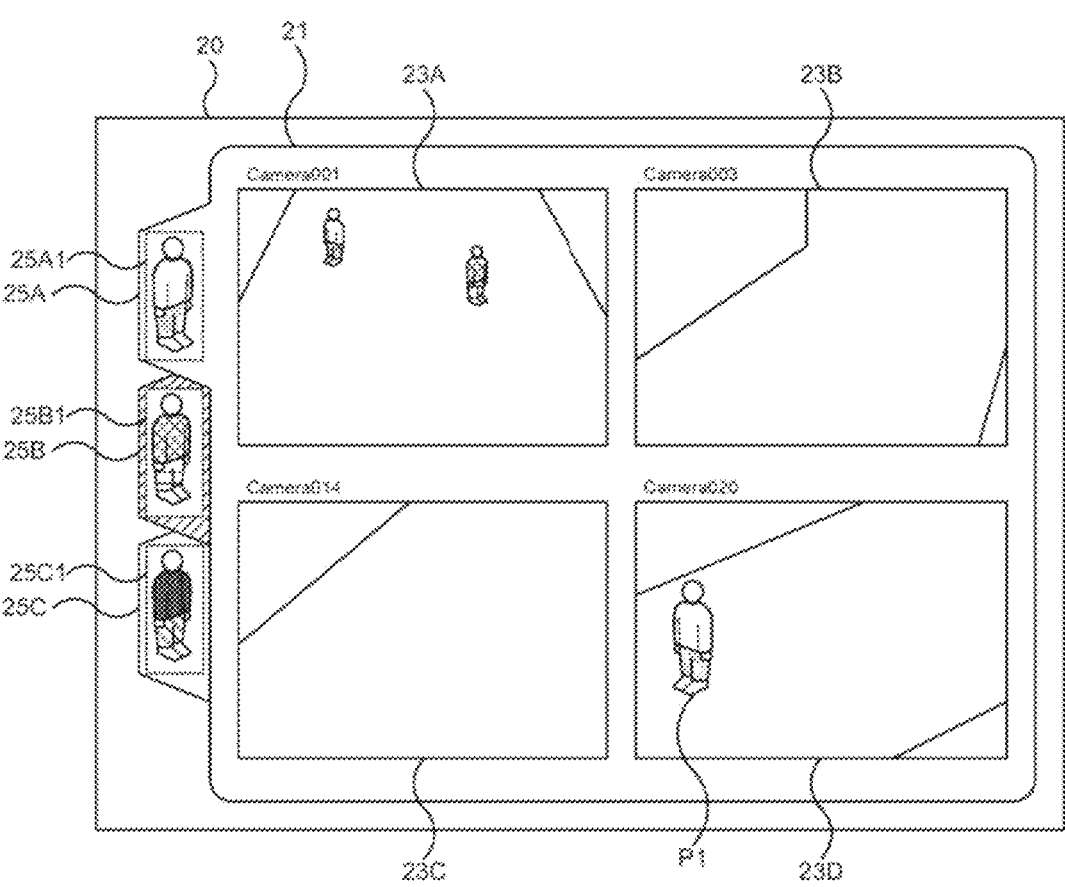
FIG. 2 is a diagram showing a specific example of a display screen.

As shown in FIG. 7, the monitoring screen 30 differs from the monitoring screen 20 shown in FIG. 2 in that the monitoring screen 30 includes video image display regions 33A to 33D instead of the video image display region 23. The most distinguished difference between these monitoring screens is that, unlike the monitoring screen according to FIG. 2, a time chart image is arranged instead of a video image in the video image display region 33D in FIG. 7. This time chart image shows in which block of time a person P who corresponds to the tab 25B was detected by respective cameras.

FIG. 8 is an enlarged view of a time chart image displayed in the video image display region 33D. T1 is a time chart indicating in which block of time a person who corresponds to a tab of a currently displayed window was detected by respective cameras. In this time chart, numbers in a column on the left side of this figure are numbers assigned to respective cameras and T2 represents a time axis. If, for example, a scale with markings for every 5 seconds is used in T2 and the current time indicated by the scale on the left-most side is 10 o'clock and moreover if FIG. 8 indicates a detection situation with respect to the person 2 corresponding to the tab 25B, this all means that T1 indicates that the camera 1 performed monitoring of a person P2 for a time block from 10:00:05 until 10:00:10. T1 also indicates that the camera 2 monitored the person P2 for a time block from 10:00:00 until 10:00:10.

T3 is a lever that is used to slide the entire section of T1 and T2 toward left or right (past or future). T4 represents buttons used to select monitoring images displayed in the video image display regions 33A to 33C in FIG. 7. In examples shown in FIG. 7 and FIG. 8, monitoring images corresponding to cameras 2, 4, and 6 are displayed in the video image display regions 33A, 33B and 33C, respectively. A process of switching the buttons in T4 is performed in accordance with operation of the input device 160. For example, if the input device is a mouse, switchover between display images may be implemented by clicking a cursor over a button to be used. If the input device 160 is a touch panel, switchover between display images may be implemented by direct touch of the buttons by a user.

The display screen generating unit 150 according to the present embodiment may produce a time chart image by using, for example, the similarity calculating unit 120, the tracked person registering unit 130, the next camera predicting unit 140, the captured video image 181, the detected person information 183, and the person tracking information 185, as explained in the first embodiment.

For example, if a person who is registered by the tracked person registering unit 130 or a pre-registered person is detected by the similarity calculating unit 120 in the captured video image 181 to be input, the display screen generating unit 150 may color in blocks of time in T1 that corresponds to the person.

Moreover, also in T1 of FIG. 8, the display screen generating unit 150 may display, on a second column from the right, a status of detection of the current time block and display, on the column on the right-most side, a status predicted by the next camera predicting unit 140, for example. In this case, the display screen generating unit 150 may display T1 in the form of real-time flow display from right to left in the video image display region 33D. Or, the display screen generating unit 150 may produce T1 not to display real-time video images but to display past video images that have been stored (offline video image data).

As thus explained, the display screen generating unit 150 according to the present embodiment arranges the time chart images on the display screen. This enables a user to visually recognize in which block of time a monitoring targeted person was detected by respective cameras in one glance.

Moreover, the display screen generating unit 150 according to the present embodiment displays buttons that enable the user to implement switchover between monitoring images so that images captured by respective cameras are selectively displayed in the video image display region 33. In use of the buttons, any switchover between images is enabled and a desired image can be displayed referencing the time chart.

4 Fourth Embodiment

Next, a monitoring system 1 according to a fourth embodiment will be described. The functional composition of the monitoring system 1 according to the present embodiment is basically similar to that according to the first embodiment shown in FIG. 1. A difference between these systems is related to a display screen generated by the display screen generating unit 150 and displayed on the display device 170. A specific example of the display screen generated by the display screen generating unit 150 according to the present embodiment is shown in FIG. 9.

Figure 9:
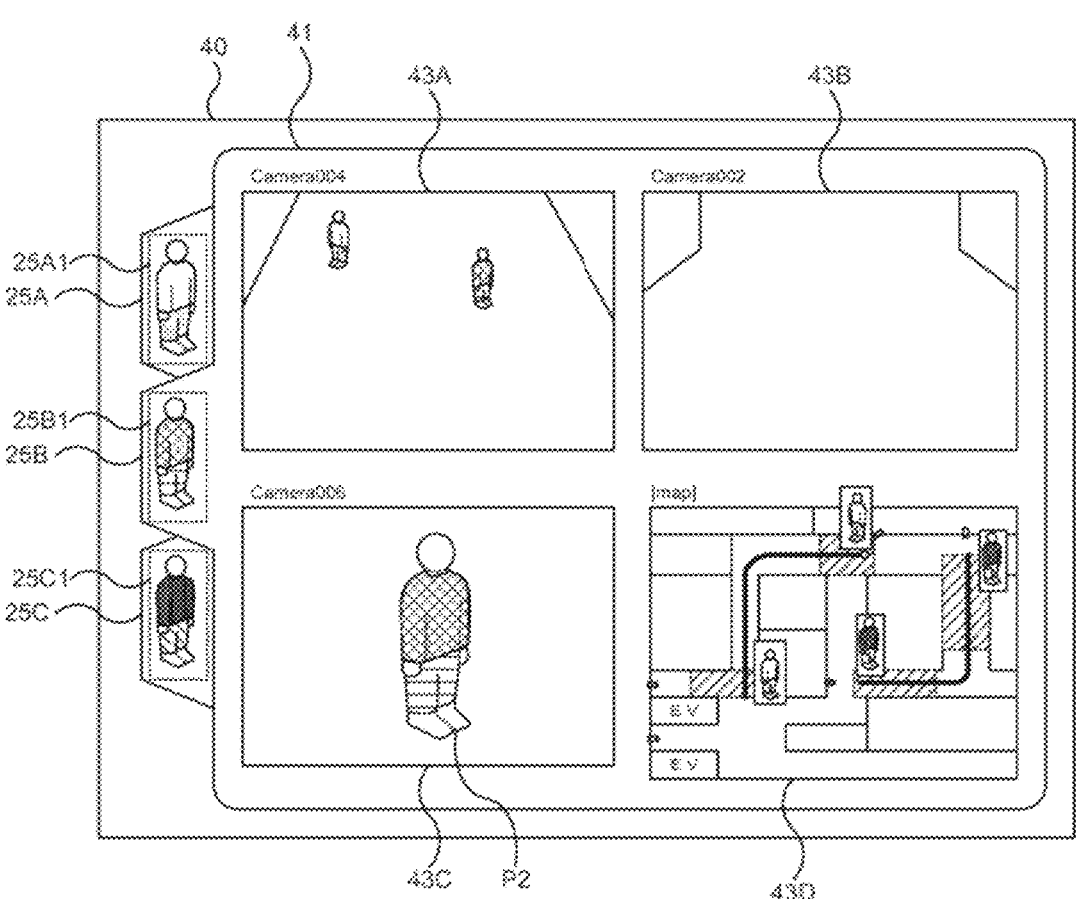
FIG. 9 is a diagram showing a specific example of a display screen according to the fourth embodiment.

As shown in FIG. 9, in each window 41 of the display screen (hereinafter referred to as a monitoring screen 40) generated by the display screen generating unit 150 according to the present invention, a map image is arranged with video images which are captured by the video camera 200 and in which a tracking target person appears or in which a tracking target person is predicted to appear.

The monitoring screen 40 differs from the monitoring screen 20 shown in FIG. 2 in that the monitoring screen 40 includes video image display regions 43A to 43D (hereinafter referred to as "video image display region 40") instead of the video image display region 23. The most distinguished difference between these monitoring screens is that a map image is arranged instead of a video image in the video image display region 43D. This map image shows the trace of a person corresponding to the tab 25A1 and a person corresponding to the tab 25B1.

The display screen generating unit 150 according to the present invention changes the map image in real-time in accordance with results of detection and tracking of a person. The display screen generating unit 150 may display the tab and trace of each targeted person (or person under monitoring) in similar colors. For example, the tab 25A and trace of a person corresponding to the tab 25A in the map image may be displayed in reddish colors, while the tab 25B and trace of a person corresponding to the tab 25B in the map image may be displayed in bluish colors. Moreover, although a person corresponding to the tab 25C is not detected and not shown in the example of FIG. 9, the tab 25C and trace of a person corresponding to the tab 25C in the map image may be displayed in yellowish colors.

In a case where the similarity calculating unit 120 detects a person, the display screen generating unit 150 may inform the user about the detection of the person by causing, in the video image, this person to be shown in the middle of a rectangle colored similarly to the color of the tab or the trace of the person.

As thus explained, the display screen generating unit 150 according to the present embodiment arranges a map image in a display screen to display the trace of movement of a person under monitoring. This enables a user to visually recognize in one glance the trace of movement of a person under monitoring.

Moreover, the display screen generating unit 150 according to the present embodiment displays the tab and trace of each person under monitoring in similar colors in the map image. This enables a user to visually recognize in one glance the trace of movement of a plurality of persons under monitoring.

5 Fifth Embodiment

Figure 10:
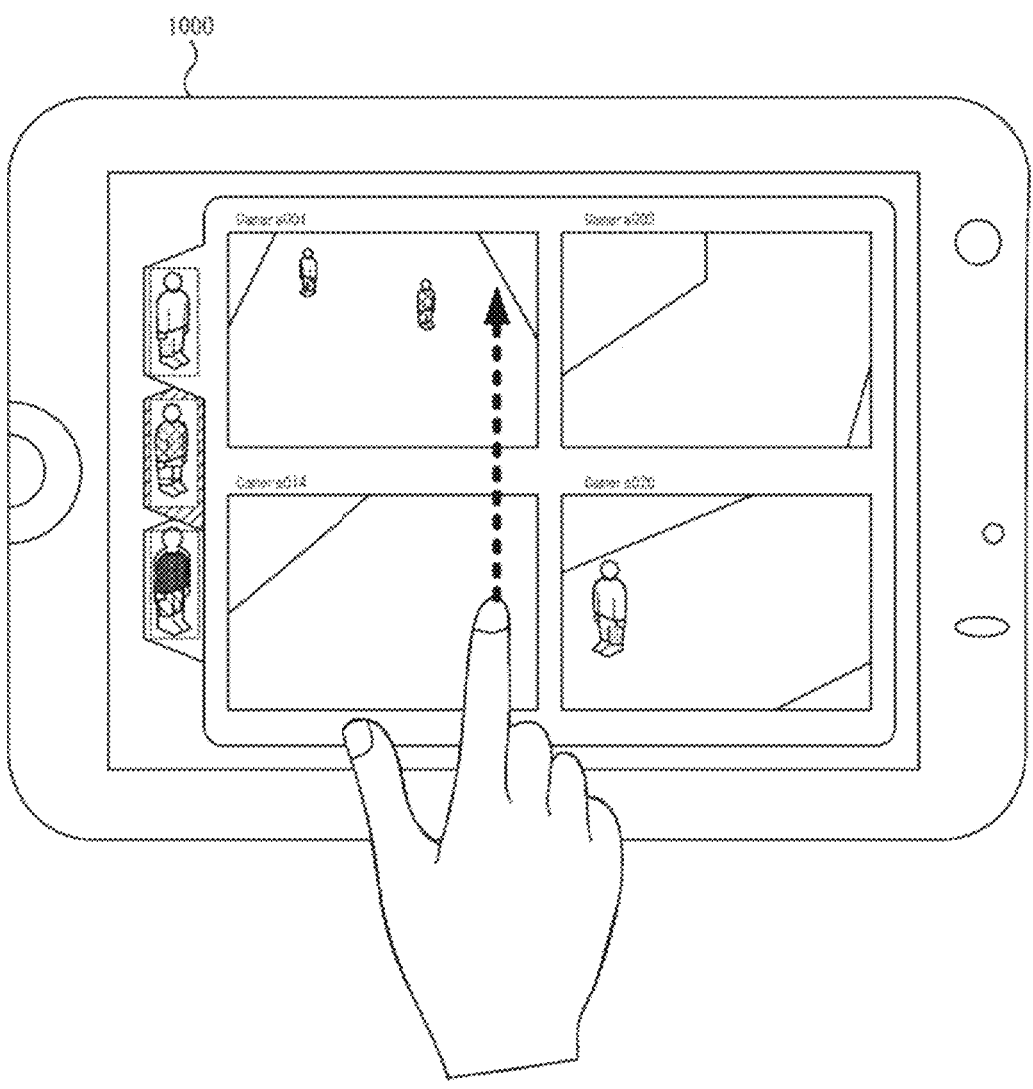
FIG. 10 is a diagram showing a specific example of appearance of a mobile terminal according to a fifth embodiment.

FIG. 10 is a diagram for describing a fifth embodiment. As shown in FIG. 10, a monitoring system 1 according to the present embodiment displays a monitoring screen (a display screen similar to the monitoring screen 20 according to the first embodiment in an example of FIG. 10) on a mobile terminal 1000. The mobile terminal 1000 may be, for example, a laptop computer, a tablet terminal, a PDA, a mobile phone, a smartphone, or a portable game unit. In the present embodiment, the display of the mobile terminal 1000 is provided in the form of a touch panel.

The monitoring system 1 according to the present embodiment implements in the mobile terminal 1000 at least the functions of the input device 160 and the display device 170 of the information processing server 100 shown in FIG. 1. By connecting the information processing server 100 and the mobile terminal 1000 suitably via wireless communication, e.g., a local area network (LAN), coordinated operation between the information processing server 100 and the mobile terminal 1000 is established. Thus, functions identical to those exhibited in the first embodiments can be implemented in the present embodiment as well.

By using a mobile terminal to function as the input device 160 and the display device 170 as shown in FIG. 10, a feature of touch panel interface may be implemented in the mobile terminal, in which, for example, when a user drags a finger on the display from a lower part to an upper part of the screen (in a direction indicated by an arrow in FIG. 10), switchover is induced by the monitoring system 1 between switchable windows each corresponding to a person under monitoring. This switchover is carried out from a window on top to a window on bottom on the display in accordance with the arranged order of tabs. Or, the user may directly touch an image area of each tab to switch a tab to another tab.

According to the present embodiment, the monitoring image is displayed on the display screen of the mobile terminal. Hence, if, for example, a security person on duty carries the mobile terminal, detailed tracking of a person under monitoring can be accomplished outdoors.

6 Appendix

Moreover, the configurations of the embodiments described above may be combined with each other or a part of the components may be replaced. In addition, configurations of the present invention are not limited to the embodiments described above and various modifications may be made without departing from the spirit and scope thereof.

A part of or all of the embodiments described above may also be described as, but not limited to, the Supplementary notes provided below.

(Supplementary Note 1)

An image processing system comprising: input means for accepting input video images captured by a plurality of video cameras; registering means capable of registering one or more persons appearing in the video images inputted from the input means; and display control means for displaying switchable windows of the video images inputted from the video cameras for each person registered by the registering means.

(Supplementary Note 2)

The image processing system according to Supplementary note 1, wherein the display control means displays switchable windows of video images inputted from the video cameras in windows respectively associated with persons registered by the registering means.

(Supplementary Note 3)

The image processing system according to Supplementary note 2, wherein the display control means prompts the windows to be switched to other windows when a person registered by the registering means is captured in the video images inputted from the video cameras.

(Supplementary Note 4)

The image processing system according to Supplementary note 2 or 3, wherein the display control means prompts the windows to be switched to other windows when a person registered by the registering means is predicted to appear in the video images inputted from the video cameras.

(Supplementary Note 5)

The image processing system according to Supplementary note 2 or 3, wherein a plurality of video images inputted from the input means are respectively arranged in the windows.

(Supplementary Note 6)

An image processing system comprising: input means for accepting input video images captured by video cameras; and display control means for displaying for each registered person a switchable window of the video image inputted from the video camera, this display control means displaying information related to the video camera that has captured the person and a time of the image capture.

(Supplementary Note 7)

An image processing system comprising: input means for accepting input video images captured by video cameras; and display control means for displaying for each registered person a switchable window of the video image inputted from the video camera, this display control means displaying map information showing trace of movement of each registered person.

(Supplementary Note 8)

The image processing system according to any one of Supplementary notes 1 to 7 above, wherein the display control means implements information display on a mobile terminal featuring a touch panel interface.

(Supplementary Note 9)

An image processing method implemented by an image processing system, the method comprising the steps of: accepting input video images captured by a plurality of video cameras; registering one or more persons appearing in the inputted video images; and displaying switchable windows of the video images inputted from the video cameras for each registered person.

(Supplementary Note 10)

The image processing method according to Supplementary note 9, further comprising displaying switchable windows of video images inputted from the video cameras in windows respectively associated with registered persons.

(Supplementary Note 11)

The image processing method according to Supplementary note 10, further comprising prompting the windows to be switched to other windows when a registered person is captured in the video images inputted from the video cameras.

(Supplementary Note 12)

The image processing method according to Supplementary note 10 or 11, further comprising prompting the windows to be switched to other windows when a registered person is predicted to appear in the video images inputted from the video cameras.

(Supplementary Note 13)

The image processing method according to Supplementary note 10 or 11, wherein a plurality of inputted video images are respectively arranged in the windows.

(Supplementary Note 14)

An image processing method comprising: input means for accepting input video images captured by video cameras; and display control means for displaying for each registered person a switchable window of the video image inputted from the video camera, this display control means displaying information related to the video camera that has captured the person and a time of the image capture.

(Supplementary Note 15)

An image processing method implemented by an image processing system, the method comprising the steps of: accepting input video images captured by video cameras; and displaying for each registered person a switchable window of the video image inputted from the video camera, wherein the image processing system displays map information showing trace of movement of each registered person.

(Supplementary Note 16)

The image processing method according to any one of Supplementary notes 9 to 15 above, wherein the image processing system displays information on a mobile terminal featuring a touch panel interface.

(Supplementary Note 17)

A program causing a computer to execute the processes of: accepting input video images captured by a plurality of video cameras; registering one or more persons appearing in the inputted video images; and displaying switchable windows of the video images inputted from the video cameras for each registered person.

(Supplementary Note 18)

The program according to Supplementary note 17, causing the computer to execute the process of displaying switchable windows of video images inputted from the video cameras in windows respectively associated with registered persons.

(Supplementary Note 19)

The program according to Supplementary note 18, causing the computer to execute the process of prompting the windows to be switched to other windows when a registered person is captured in the video images inputted from the video cameras.

(Supplementary Note 20)

The image processing method according to Supplementary note 18 or 19, causing the computer to execute the process of prompting the windows to be switched to other windows when a registered person is predicted to appear in the video images inputted from the video cameras.

(Supplementary Note 21)

The program according to Supplementary note 10 or 11, wherein a plurality of inputted video images are respectively arranged in the windows.

(Supplementary Note 22)

An program causing a computer to execute the process of: accepting input video images captured by video cameras; and displaying for each registered person a switchable window of the video image inputted from the video camera, wherein the program displays information related to the video camera that has captured the person and a time of the image capture.

(Supplementary Note 23)

An program causing a computer to execute the process of: accepting input video images captured by video cameras; and displaying for each registered person a switchable window of the video image inputted from the video camera, wherein the program displays map information showing trace of movement of each registered person.

(Supplementary Note 24)

The program according to any one of Supplementary notes 17 to 22 above, wherein the program displays information on a mobile terminal featuring a touch panel interface.

The present application claims priority on the basis of Japanese Patent Application No. 2012-170406 filed on Jul. 31, 2012, the entire contents of which are incorporated herein by reference.

15

I claim:

1. A video surveillance method, comprising:

receiving a first video frame captured by a first camera and a second video frame captured by a second camera, the second camera being different from the first camera;

receiving detection information of a first person in the first video frame;

outputting the first video frame including the detected first person;

controlling to output first notification information, in a case where a second person is detected from the second video frame while the first video frame including the detected first person is being displayed on a display, wherein the second video frame is captured by the second camera that is different from the first camera and the first notification information includes a detection result of the second person;

controlling to output screen information including a first plurality of images and first time information, the first time information being related to detection of the first person;

receiving a user input for selecting at least one camera from among a plurality of cameras; and based on the user input, controlling to output the screen information including a second plurality of images, the second plurality of images being obtained from video captured by the at least one selected camera, the first plurality of images having a difference from the second plurality of images.

2. The video surveillance method according to claim 1, further comprising:

notifying a user with the first notification information, in a case where the second person is detected in the second video frame while the first video frame including the detected first person is being displayed on the display, the first notification information including the detection result of the second person.

3. The video surveillance method according to claim 1, further comprising:

controlling to output the screen information including the first plurality of images from video frames, detection time information related to the video frames, and the first time information related to the detection of the first person.

4. The video surveillance method according to claim 1, wherein the first notification information includes at least one of an image and a text message.

5. The video surveillance method according to claim 4, wherein the image includes at least one of the second person and an area where the second person is detected.

6. The video surveillance method according to claim 1, further comprising:

receiving a third video frame captured by a third camera;

receiving second time information related to detection of a third person in the third video frame; and controlling to output second notification information on the display or sound information, in a case where the second time information satisfies a predetermined time.

7. The video surveillance method according to claim 6, wherein the predetermined time is set in advance.

8. The video surveillance method according to claim 1, further comprising:

detecting the first person in the first video frame; and tracking the detected first person.

9. A video surveillance system, comprising:

at least one memory storing instructions; and at least one processor configured to:

receive a first video frame captured by a first camera and a second video frame captured by a second camera, the second camera being different from the first camera;

receive detection information of a first person in the first video frame;

output the first video frame including the detected first person;

control to output first notification information, in a case where a second person is detected from the second video frame while the first video frame including the detected first person is being displayed on a display, wherein the second video frame is captured by the second camera that is different from the first camera and the first notification information includes a detection result of the second person;

control to output screen information including a first plurality of images and first time information, the first time information being related to detection of the first person;

control to receive a user input for selecting at least one camera from among a plurality of cameras; and control to output, based on the user input, the screen information including a second plurality of images, the second plurality of images being obtained from video captured by the at least one selected camera, the first plurality of images having a difference from the second plurality of images.

10. The video surveillance system according to claim 9, wherein the at least one processor is further configured to:

notify a user with the first notification information, in a case where the second person is detected in the second video frame while the first video frame including the detected first person is being displayed on the display, the first notification information including the detection result of the second person.

11. The video surveillance system according to claim 9, wherein the at least one processor is further configured to:

control to output the screen information including the first plurality of images from video frames, detection time information related to the video frames, and the first time information related to the detection of the first person.

12. The video surveillance system according to claim 9, wherein the first notification information includes at least one of an image and a text message.

13. The video surveillance system according to claim 12, wherein the image includes at least one of the second person and an area where the second person is detected.

14. The video surveillance system according to claim 9, wherein the at least one processor is further configured to:

receive a third video frame captured by a third camera;

receive second time information related to detection of a third person in the third video frame; and control to output second notification information on the display or sound information, in a case where the second time information satisfies a predetermined time.

15. The video surveillance system according to claim 14, wherein the predetermined time is set in advance.

16. The video surveillance system according to claim 9, wherein the at least one processor is further configured to:

detect the first person in the first video frame; and track the detected first person.

17. The video surveillance method according to claim 1, wherein the first notification information includes a text message notifying the second person was detected.

18. The video surveillance method according to claim 1, wherein the screen information includes detection results of the first person, the detection results arranged in chronological order.

19. The video surveillance method according to claim 1, further comprising:

controlling to display the first video frame including the detected first person on the display;

controlling to display the first notification information on the display; and in a case of receiving an input for the first notification information after displaying the first notification information, controlling to change a video frame displayed on the display from the first video frame including the detected first person to the second video frame including the detected second person.

20. A video surveillance method, comprising:

obtaining a plurality of first video images captured by a first video camera;

determining that at least one of the plurality of first video images includes a first image of a first person;

selecting a first thumbnail image from the plurality of first video images that includes the first image of the first person, the first thumbnail image being a still image;

generating a first notification, wherein the first notification provides time information related to detection of the first person and includes the first thumbnail image;

controlling to display in a first window the first notification;

obtaining a plurality of second video images captured by a second video camera;

determining that at least one of the plurality of second video images includes a second image of a second person;

selecting a second thumbnail image from the plurality of second video images that includes the second image of the second person, the second thumbnail image being a still image;

generating a second notification, wherein the second notification provides time information related to detection of the second person and includes the second thumbnail image;

controlling to display in the first window the second notification;

controlling to display the first notification and the second notification on a display;

detecting a selection of the first notification on the display by a user; and after detecting the selection of the first notification on the display by the user, controlling to display a second window, wherein the second window is configured to display the plurality of first video images including the first person.

21. The video surveillance method according to claim 20, further comprising displaying a third window that displays real-time video image captured by the first video camera and a fourth window that displays real-time video image captured by the second video camera.

22. The video surveillance method according to claim 20, wherein the first notification further includes text information indicating a name corresponding to the first video camera, and the second notification further includes text information indicating a name corresponding to the second video camera.

23. The video surveillance method according to claim 20, further comprising:

tracking the first person by the first video camera; and tracking the second person by the second video camera.

* * * * *